United States Patent
Hagemeyer et al.

(10) Patent No.: US 9,800,147 B2
(45) Date of Patent: Oct. 24, 2017

(54) CHOKE CIRCUIT FOR A BUS POWER SUPPLY

(71) Applicant: FRIWO Gerätebau GmbH, Ostbevern (DE)

(72) Inventors: Andreas Hagemeyer, Ostbevern (DE); Ingolf Bonkhoff, Telgte (DE)

(73) Assignee: FRIWO Gerätebau GmbH, Ostbevern (DE)

( * ) Notice: Subject to any disclaimer, the term of this patent is extended or adjusted under 35 U.S.C. 154(b) by 308 days.

(21) Appl. No.: 14/274,882

(22) Filed: May 12, 2014

(65) Prior Publication Data
US 2014/0333279 A1    Nov. 13, 2014

(30) Foreign Application Priority Data
May 10, 2013    (EP) ..................................... 13167312

(51) Int. Cl.
*H02M 3/156*    (2006.01)
*H02M 3/158*    (2006.01)
(Continued)

(52) U.S. Cl.
CPC ......... *H02M 3/1563* (2013.01); *H02M 3/156* (2013.01); *H02M 3/1588* (2013.01);
(Continued)

(58) Field of Classification Search
CPC ........................... H02M 3/1563; H02M 3/156
(Continued)

(56) References Cited

U.S. PATENT DOCUMENTS

| | | | | |
|---|---|---|---|---|
| 4,356,371 A * | 10/1982 | Kiuchi | ................... | H05B 6/062 219/626 |
| 4,823,023 A * | 4/1989 | Shimpo | ............... | H02M 3/1563 327/485 |
| 6,943,504 B1 * | 9/2005 | York | ................. | H05B 33/0815 315/224 |

(Continued)

FOREIGN PATENT DOCUMENTS

| EP | 2549679 | 1/2013 |
|---|---|---|
| WO | 2011085703 | 7/2011 |

OTHER PUBLICATIONS

Extended European Search Report from the European Patent Office for Application No. 13167312.1-1862 dated Sep. 4, 2013 (5 pages).

*Primary Examiner* — Jue Zhang
*Assistant Examiner* — Trinh Dang
(74) *Attorney, Agent, or Firm* — Michael Best & Friedrich LLP

(57) ABSTRACT

The invention relates to a choke circuit and a bus power supply incorporating same. Such a coil choke circuit includes an inductor connected between a first input terminal and a first output terminal, a boost circuit connected between a second input terminal and a second output terminal for increasing the voltage level that is output by the second output terminal. A switching element is connected in parallel to the boost circuit for bypassing the boost circuit. Additionally, a comparator is connected between the first input terminal and the first output terminal for detecting a potential difference across the inductor; wherein in case the comparator detects a potential difference higher than a threshold, the switching element is controlled to be in an OFF state; and in case the comparator detects a potential difference lower than or equal to the threshold, the switching element is controlled to be in an ON state.

14 Claims, 10 Drawing Sheets

(51) Int. Cl.
   *H04B 3/54* (2006.01)
   *H04B 3/56* (2006.01)
(52) U.S. Cl.
   CPC .............. *H04B 3/548* (2013.01); *H04B 3/56* (2013.01); *H04B 2203/547* (2013.01); *H04B 2203/5491* (2013.01)
(58) Field of Classification Search
   USPC ......................................................... 323/299
   See application file for complete search history.

(56) References Cited

U.S. PATENT DOCUMENTS

| | | | | |
|---|---|---|---|---|
| 2005/0162022 | A1* | 7/2005 | Allard | H02M 5/08 307/140 |
| 2008/0100273 | A1* | 5/2008 | Uruno | H02M 1/4208 323/271 |
| 2009/0085537 | A1* | 4/2009 | Nakabayashi | H02M 3/158 323/273 |
| 2009/0085656 | A1* | 4/2009 | Havanur | H03K 17/164 327/581 |
| 2009/0173732 | A1* | 7/2009 | Gong | H05B 6/06 219/663 |
| 2012/0039095 | A1* | 2/2012 | Kim | H02M 3/155 363/21.04 |
| 2013/0155561 | A1* | 6/2013 | Lai | H02H 3/202 361/91.5 |
| 2013/0293135 | A1* | 11/2013 | Hu | H05B 33/0815 315/224 |
| 2013/0313974 | A1* | 11/2013 | Fan | H05B 33/0815 315/127 |

* cited by examiner

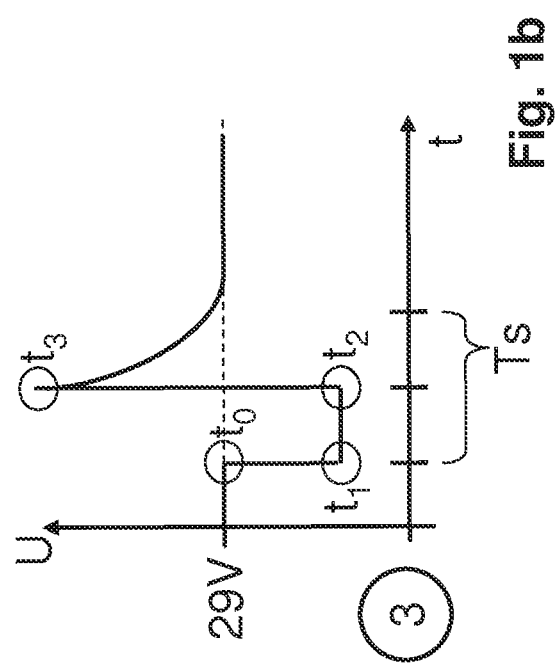

CHOKE CIRCUIT FOR A BUS POWER SUPPLY

BACKGROUND

The invention relates to an improved choke circuit and a bus power supply incorporating an active choke circuit for use in a KNX TP bus.

SUMMARY

Choke circuits are commonly known as integral parts of bus power supplies. In the exemplary KNX Twisted Pair, KNX TP, bus, as standardized in EN 50090, a bus power supply supplies bus nodes with power via a twisted pair cable. In this respect, one or more bus nodes are subsequently connected via a bus, namely the twisted pair cable, to the bus power supply to form a bus segment.

The one or more bus nodes are supplied from a bus power supply via the bus with an operating voltage. As specified for the KNX TP bus, a bus power supply provides an operating direct current, DC, voltage of 29 V to the bus.

The bus nodes are configured to work properly at DC voltages of at least 21 V. In this respect, a tolerance range of 8 V safe-guards the KNX TP bus from intermittent failures. Accordingly, even in case of a modest voltage drop on the bus or in case of a high contact resistance, the KNX TP bus and the connected bus node stay operational.

At the same time, the one or more bus nodes are configured to transmit data via the bus, namely same twisted pair cable. For this purpose, a bus node detects, in addition to the DC supply voltage, an alternating current, AC, transmit signal superimposed on the bus. A transformer allows in each bus node for decoupling the AC transmit signal from the DC supply voltage; a capacitor may stabilize the DC supply voltage. The transformer may also be used for transmission of data by a bus node via the bus.

For data transmission, the KNX TP bus specifies two different transmit signal forms representing a "0"-bit value or a "1"-bit value. A "0"-bit is transmitted in form of an AC signal superimposed on the DC supply voltage. A "1"-bit value is transmitted in the absence of alternating currents, namely by maintaining the DC supply voltage unchanged. In other words, a transmission of subsequent "1"-bit values may be identified as "idle state" of the bus.

An important property of the KNX TP bus is that signal transmissions are carried out differentially via the bus. In other words, the bus does not specify a predefined reference potential, e.g. a ground potential wire, but instead bus nodes receives data transmissions as differential signals between the two wires of the twisted pair cable. Thereby, the KNX TP bus provides for better electromagnetic immunity at the expense of a slightly higher hardware complexity.

The differential transmission of a "0"-bit is realized as follows: For the transmission of the AC waveform, at first, the bus node actively lowers the potential on the bus by approx. 5 V (e.g. from 29V to 24V). After approx. one third of the signal width, the bus node stops lowering the potential on the bus. This lowering of the potential on the bus corresponds to a negative half-wave of a transmit signal.

Then, when the bus node stops lowering the potential on the bus, the bus acts causing a voltage overshoot by an inductive reaction, i.e. the potential between the two wires of the twisted pair cable exceeds the idle state of the bus.

Specifically, the KNX TP bus arranges for a transformers and capacitors in each bus node and also for a choke circuit in the bus power supply which together act as the resonant circuit. Moreover, the overshoot of the voltage corresponds to the positive half-wave of the transmit signal.

An exemplary KNX TP bus system is shown in FIGS. 1a and 1b. The bus system 100 includes a DC power supply 110 configured to supply a DC voltage of 29 V. This DC voltage is provided via choke circuit 120 to the bus to which at least one bus node 130 is connected. The DC power supply 110 and the choke circuit 120 form together a bus power supply.

Specifically, choke circuit 120 includes a choke (e.g. a common-mode choke) that is connected via DC+ and DC− terminal to the DC power supply 110 on one side and connected via the bus, i.e. terminals Bus+, Bus−, to the at least one bus node 130 on the other side. Due to this choke in choke circuit 120, data transmissions between bus nodes 130 become possible.

As previously described, for transmitting data, e.g. a "0"-bit, a bus node 130 reduces the potential between Bus+ and Bus− by about 5V. Without choke circuit 120, the DC power supply 110 would immediately counteract the lowered potential on the bus since commonly known DC power supplies are configured to resist high loads currents. Thus, the DC power supply 110 would, in the absence of the choke circuit 120, inhibit the lowering of the potential by the bus node 130.

In more detail, bus node 130 transmits a "0"-bit by us of current source $I_{L3}$ driving at position (1) a current through the winding L3 of transformer in order to induce a magnetic field in the transformer included in the bus node 130. Since winding L3 is magnetically coupled with windings L1 and L2, Voltages $U_{L1}$ and $U_{L2}$ are respectively induced in windings L1 and L2 at position (2).

Thus, the summed voltages $U_{L1}$ and $U_{L2}$, as generated by the bus node 130, reduce the potential between Bus+ and Bus− at position (3), namely the negative half-wave, while at the same time the voltage at the capacitor remains stable 29V. This reduction of potential is shown in FIG. 1b at times $t_1$ to $t_2$ as present at position (3).

When the bus node 130 stops reducing the potential between Bus+ and Bus− at position (3), the resonant circuit of the bus including the transformers and capacitors of each bus node 130 and the choke in choke circuit 120 provide for the positive half-wave of the transmit signal. This overshoot is shown in FIG. 1b at time $t_3$ as present at position (3).

As illustrated in FIG. 1a, the choke circuit 120 is conventionally realized as common-mode choke element including two magnetically coupled windings, a first winding separating the DC power supply 110 from the Bus+ wire and a second winding separating the DC power supply 110 from the Bus− wire of the bus.

Although the two windings of the common-mode choke circuit 120 find their correspondence in the windings L1 and L2 of the transformer in bus node 130 and allow blocking common-mode currents (e.g. due to electromagnetic interference), the common-mode choke of choke circuit 120 is rather expensive, bulky and from a manufacturing point of view a highly complex circuit element.

Furthermore, the two windings of the common-mode choke circuit 120 provide for a substantial DC resistance value which reduces the power efficiency of the choke circuit 120. Accordingly, for supply of bus node 130 with a DC voltage, the DC resistance of the choke circuit 120 has a disadvantageous influence on the power dissipation of the bus system 100.

In this respect, it is an object of the invention to suggest an improved choke circuit which overcomes the disadvantages noted above.

The object is achieved by the subject-matter of the independent claims. Advantageous embodiments are subject to the dependent claims.

According to a first aspect of the invention, the improved choke circuit includes an inductor L11 and a boost circuit assisting the inductor L11 for preserving the data transmission signal integrity. Accordingly, the boost circuit dispenses with the need for an expensive, bulky and from a manufacturing point of view highly complex choke circuit.

As described with respect to the background of the invention, data transmissions are carried out by a bus node reducing the voltage level of the bus by a predefined voltage level (e.g. 5V). This is achieved by the bus node drawing a current from the bus for approx. one third of the signal width.

The reduced voltage level corresponds to a negative half-wave of a data transmission. Thereafter, the inductor of the choke circuit on the bus induces a voltage peak corresponding to positive half-wave of a data transmission.

For simplicity we assume that a bus node is configured to draw similar currents i for data transmissions via the bus, i.e. the current is independent from the bus load or of the supplied voltage level $U_{DC}$. Then, the voltage level $U_{BUS}$ of the bus is determined by the inductance L of the inductor L11 included in the choke circuit, namely as $U_{BUS}=U_{DC}-L \cdot di/dt$. In this respect, a reduction of the inductance L of the inductor included in the choke circuit is proportional to an increase in voltage level $U_{BUS}$ on the bus.

Previously, it was common understanding that the inductance L of the choke circuit cannot be reduced because for other bus nodes to correctly detect data transmission, a predefined potential difference of approx. 5 V (e.g. from 29V to 24V) is required.

In the invention, now the choke circuit allows for a reduced inductance value of the inductor in the choke circuit due to the provision of an additional boost circuit which assists the inductor for preserving the data transmission signal integrity.

Specifically, the boost circuit in the choke circuit of the invention counteracts the reduction in potential difference by temporarily increasing the reference potential, e.g. for the time of a negative half-wave of a data transmission. In this respect, bus nodes are exposed to a same reduction by a predefined voltage level on the bus as in former times. The reduction by a predefined voltage level enables a correct decoding of transmitted data.

Exemplary, the choke circuit of the invention may include an inductor L11 with a reduced inductance value L/2. Without boost circuit, in case of data transmissions the voltage level on the bus would also be reduced by only half of the predefined voltage level (i.e.: $\Delta U=L/2 \cdot di/dt$). However, the boost circuit counteracts the reduction and restores the predefined voltage level on the bus by temporarily increasing the voltage level on bus by $\Delta U$ (i.e. by increasing the voltage to be output by the second output terminal Bus-). Consequently, the bus nodes experience the same predefined potential difference.

According to one exemplary embodiment in line with the first aspect of the invention a choke circuit is suggested for providing an input voltage supplied by a DC power supply to at least one bus node. The choke circuit 220 comprises two input terminals for receiving the input voltage supplied by the DC power supply; and two output terminals for outputting a voltage based on the input voltage to the at least one bus node. The choke circuit further comprises an inductor connected between a first input terminal and a first output terminal; a boost circuit connected between the second input terminal and the second output terminal for increasing the voltage level that is output by the second output terminal; and switching element connected in parallel to the boost circuit for bypassing the boost circuit interposed between the second input terminal and the second output terminal. A comparator, further comprised in the choke circuit, is connected between the first input terminal and the first output terminal for detecting a potential difference across the inductor; wherein in case the comparator detects a potential difference higher than a threshold, the switching element is controlled to be in an OFF state such that a voltage level, increased by the boost circuit, is output by the second output terminal; and in case the comparator detects a potential difference lower than or equal to the threshold, the switching element is controlled to be in an ON state such that the boost circuit is bypassed and a voltage level, corresponding to the input voltage, is output by the second output terminal.

According to a more detailed embodiment, the boost circuit is configured to increase by a predefined voltage level the voltage level that is output by the second output terminal, the predefined voltage level being determined based on the inductance of the inductor.

According to another more detailed embodiment, the boost circuit includes: a first series circuit connected between the second input terminal and the second output terminal, the first series circuit being formed of a diode and a capacitor for storing, in the capacitor, charges flowing as a send current between the two output terminals; wherein the send current results from a data transmission of one of the at least one bus node; and wherein the boost circuit is configured to increase by an amount of charges stored in the capacitor the voltage level that is output by the second output terminal.

According to a further more detailed embodiment, the first series circuit of the choke circuit additionally includes a Zener diode connected in parallel to the capacitor for limiting the amount of charges stored on the capacitor such that the voltage across capacitor corresponds to the predefined voltage level.

According to yet another more detailed embodiment, the first series circuit of the choke circuit additionally includes a voltage regulator connected in parallel to the capacitor for limiting the amount of charges stored on the capacitor such that the voltage level across capacitor corresponds to the predefined voltage level.

According to a more detailed embodiment, the first series circuit of the choke circuit further includes a switching converter connected in parallel to the capacitor for limiting the amount of charges stored on the capacitor by up-converting and feeding back energy into the first input terminal such that the voltage level across capacitor corresponds to the predefined voltage level.

According to another more detailed embodiment, the switching converter of the choke circuit comprises: a series circuit of an inductor and a switching element connected in parallel to the capacitor; and a diode connected to the intermediated node of the series circuit of the inductor and the switching element and to the first input terminal and configured to feed back energy from the inductor into the first input terminal.

According to a further more detailed embodiment, the choke circuit further comprises: a reference voltage source for generating a reference voltage, the reference voltage being determined based on the predefined voltage level; a second comparator configured to compare a voltage across the capacitor with the reference voltage; and wherein the switching element of the switching converter is configured to be controlled based on the comparison result of the second comparator.

According to yet another more detailed embodiment, the reference voltage supplied by the reference voltage source of the choke circuit is varied based on a DC bus load resulting from the at least one bus node.

According to a more detailed embodiment, the reference voltage source of the choke circuit further comprises: a shunt resistor connected so as to carry the load current affected by the DC bus load, and wherein the resistance value of the shunt resistor corresponds to the DC resistance of the inductor.

According to another more detailed embodiment, the reference voltage source of the choke circuit further comprises: a converter circuit for filtering, amplifying and converting the voltage over the shunt resistor and outputting it as a reference voltage to the second comparator.

According to a further more detailed embodiment, the choke circuit further comprises: a resistor and a second series circuit, formed of a diode and of another resistor, both the resistor and the second series circuit being connected in parallel to the inductor.

According to yet another more detailed embodiment, the inverting input of the comparator of the choke circuit is connected via first voltage divider and a capacitor to the first input terminal, and the non-inverting input of the comparator is connected via second voltage divider and another capacitor to the first output terminal.

According to a more detailed embodiment, the choke circuit further comprises: a pull-up resistor configured to supply a voltage to the first switching element for enabling the comparator to control the switching element, and a resistor configured to connect the output of the comparator to the gate terminal of the switching element.

According to an alternatively more detailed embodiment, the choke circuit further comprises: a driving circuit configured to drive an output voltage of the comparator for control of the switching element.

According to a second aspect of the invention, a bus power supply is proposed which allows incorporating same, previously describe choke circuit.

In view of the less expensive, more efficient, less bulky and from a manufacturing point of view less complex choke circuit, same choke circuit may now be incorporated into the bus power supply for a reduction of the assembly steps and a improvement of the module integration level.

According to another exemplary embodiment in line with the second aspect of the invention a bus power supply is suggested for providing a voltage to at least one bus node. The bus power supply comprises: a DC power supply circuit for providing a DC voltage; and a choke circuit according to one of the previously described embodiments; wherein the DC power supply circuit is connected to the two input terminals of the choke circuit.

The accompanying drawings are incorporated into the specification and form a part of the specification to illustrate several embodiments of the present invention. These drawings, together with a description, serve to explain the principles of the invention. The drawings are merely for the purpose of illustrating the preferred and alternative examples of how the invention can be made and used, and are not to be construed as limiting the invention to only the illustrated and described embodiments. Furthermore, several aspects of the embodiments may form—individually or in different combinations—solutions according to the present invention. Further features and advantages will be apparent from the following more particular description of the various embodiments of the invention as illustrated in the accompanying drawings, in which like references refer to like elements.

BRIEF DESCRIPTION OF THE DRAWINGS

FIGS. 1a and 1b schematically show a conventional KNX TP bus including a bus power supply, a choke circuit and a bus node and a data transmission signal on the KNX TP bus.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 2:
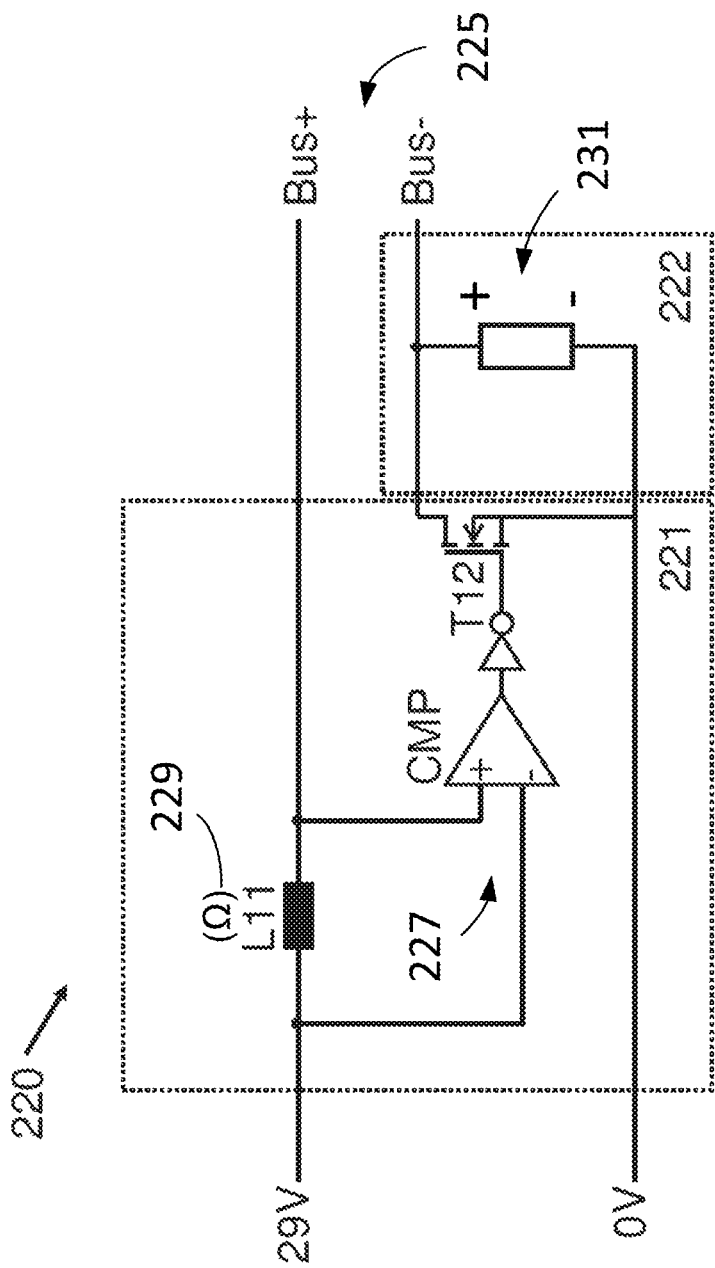
FIG. 2 schematically shows a choke circuit according to a first embodiment of the invention.

Referring now to FIG. 2, a choke circuit 220 according to a first embodiment of the invention is shown. The choke circuit 220 of this embodiment includes a decoupling circuit 221 and a boosting circuit 222 and may be used together with an externally connected DC power supply 110 and at least one externally connected bus node 130.

Figure 1A:
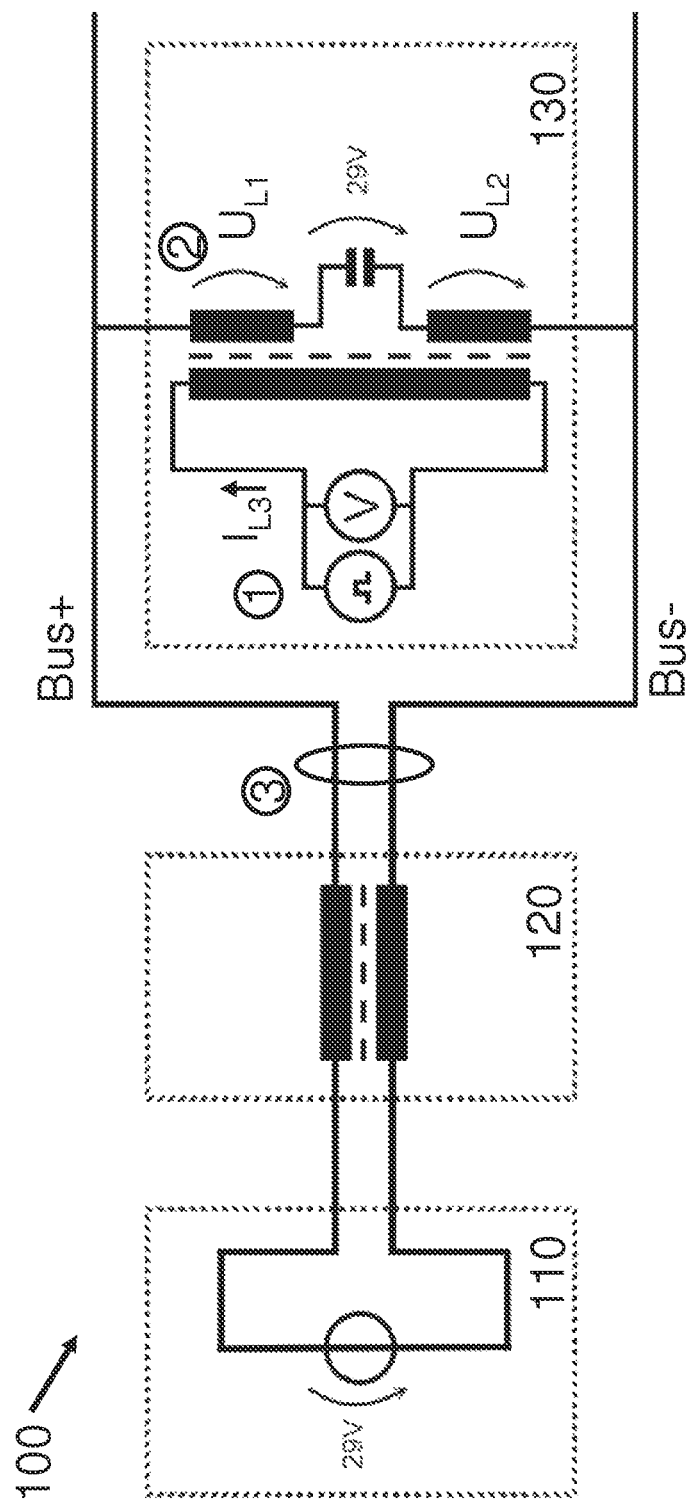

The choke circuit 220 includes two input terminals, namely DC+, DC−, for receiving an input voltage from an externally connected DC power supply. The DC power supply may be realized as shown in FIG. 1.

In a KNX TP bus, the DC power supply provides 29 V to the DC+ terminal of the choke circuit 220 and 0V to the DC− terminal of the choke circuit 220. However, it can be readily appreciated that the choke circuit 220 may be used with any other voltage levels and is not restricted in this respect.

Further, the choke circuit 220 includes two output terminals, namely Bus+, Bus−, for outputting a voltage level 225 to at least one bus node. The voltage level 225 output by the choke circuit 220 is used by the at least one bus node as a source of power.

The output voltage level is based on the input voltage. In a KNX TP bus, the output voltage level is approximately 29V between the output terminals Bus+ and Bus−. However, also in this case it can be readily appreciated that various other voltage levels may be output and that the choke circuit 220 is not restricted in this respect.

The choke circuit 220 includes the decoupling circuit 221 for inductively decoupling the input terminals DC+, DC− from the output terminals Bus+, Bus−. The choke circuit 220 also includes boost circuit 222. The decoupling circuit 221 of choke circuit 220 includes an inductor L11, a comparator CMP and a switching element T12.

The inductor L11 of circuit 221 is connected between to a first input terminal DC+ and a first output terminal Bus+. Accordingly, the inductor L11 forwards a DC component of the input voltage at the first input terminal DC+ to the first output terminal Bus+−.

Due to the inductor L11, data transmissions between bus nodes become possible. Specifically, for transmitting a "0"-bit, a bus node reduces the voltage between the output terminals Bus+ and Bus− by a predefined voltage level (e.g. approx. 5V). With the inductor L11 interposed between the first input terminal DC+ and the first output terminal Bus+−, higher-frequency alternating currents are suppressed from being passed on from the bus, namely first output terminal Bus+, to the DC power supply, namely first input terminals DC+.

Specifically, the inductance of inductor L11 prevents from forwarding sudden changes in potential on the bus to the bus power supply; instead the inductor L11 delays an alternating current and thereby relieves the bus power supply from counteract a changed (e.g. lowered) potential on the bus.

The inductor L11 may be implemented as a choke e.g. made of a wire or other conductor wound into a coil, to increase the magnetic field. However, the inductor L11 may also be implemented in any other conceivable way as long as it provides an inductance with the above noted properties.

The boost circuit 222 is connected between a second input terminal DC− and a second output terminal Bus−. The second input terminal DC− and second output terminal Bus− shall be understood as being not the first input terminal of the two input terminals and not the first output terminal of the two output terminals between which the inductor L11 is connected. In other words, the inductor L11 and the boost circuit 222 provide for separated paths between the two input terminals DC+, DC− and the output terminals Bus+, Bus− of the choke circuit 220.

The boost circuit 222 is configured to increase the voltage level output by the second output terminal Bus−. Accordingly, the boost circuit 222 does not only forward the voltage supplied to the second input terminal DC− but may increase the voltage level such that, at least for limited amount of time, a higher voltage level is output by the second output terminal Bus−.

According to an advantageous implementation, the boost circuit 222 is configured to increase the voltage output by the second output terminal Bus− by a predefined voltage level 231. The predefined voltage level is determined based on the inductance of the inductor L11.

Further, switching element T12 of circuit 221 is also connected between the second input terminal DC− and the second output terminal Bus−. Accordingly, the switching element T12 is connected in parallel to the boost circuit 222 and enables bypassing (i.e. short-circuiting) the second output terminal Bus− to the second input terminal DC−.

Exemplary, the switching element T12 is implemented as a transistor, e.g. as a metal-oxide-semiconductor field-effect transistor, MOSFET, as a power MOSFET, as bipolar junction transistor, BJT, a junction gate field-effect transistor JFET, or as an insulated-gate bipolar transistor, IGBT. Depending on the desired circuit properties, either of the transistor types may be advantageous for its inherent characteristics.

The switching element T12 provides for a bypass to the boost circuit 222 such that the voltage level supplied to the second input terminal DC− may be passed on by the switching element T12 (e.g. via a drain-source channel) and output by the second output terminal Bus−.

Consequently, due to the parallel connection of the switching element T12 and of the boost circuit 222, the switching element T12 determines the voltage level supplied to and output by the second input terminal DC− at time periods when switching element T12 is in an ON state and does not determine the voltage level when switching element T12 is in an OFF state. In the later situation, a voltage level increased by the boost circuit 222 is supplied to and output by the second output terminal Bus−.

In more detail, the switching element T12 is configured so as to enable or disable current to flow via the switching element T12 between the second input terminal DC− and the second output terminal Bus−, thereby bypassing or not-bypassing the boost circuit 222.

In an ON state, the switching element T12 allows current to flow via the switching element T12 between the second input terminal DC− and the second output terminal Bus− such that the boost circuit 222 is bypassed. In an OFF state, the switching element T12 inhibits current from flowing via the switching element T12 such that the boost circuit 222 is not bypassed and, hence, the boost circuit 222 determines the voltage level output by the second output terminal Bus−.

The switching element T12 is controlled based on a detection result of comparator CMP additionally included in circuit 221.

Exemplary, the comparator CMP is implemented as operational amplifier. There are many different realizations of an operational amplifier which may advantageous for its inherent characteristics. However, also other implementations for a comparator CMP are conceivable. In this respect, the examples shall not be understood limiting the invention.

The inputs of comparator CMP are connected to the first input terminal DC+ and to the first output terminal Bus−. Thereby, the comparator CMP is configured to detect a voltage difference subject to the inductor L11. In other words, the comparator CMP is adapted to detect AC signals resulting from data transmissions on the bus. Specifically, the comparator CMP would be able to detect situations where a bus node 130 first starts drawing and then stops drawing a current between the two output terminals Bus+ and Bus−.

In more detail, inductor L11 is connected between the first input terminal DC+ and the first output terminal Bus+ and is, hence, exposed to changes in the potential on the bus, i.e. between Bus+ and Bus−. The inductor L11 prevents from forwarding sudden changes in voltage on the bus to the bus power supply. Consequently, a potential difference 227 builds up over the inductor L11 (i.e. between the first input terminal DC+ and the first output terminal Bus+ to both of which the inductor L11 is connected).

Accordingly, in case of changes due to data transmissions, the comparator CMP detects a voltage difference between the first input terminal DC+ and the first output terminal Bus−. This detection result of the comparator CMP is utilized for control of the switching element T12.

Specifically, in case the comparator CMP detects a voltage difference higher than a predefined threshold (e.g. higher than the DC resistance 229 of the inductor L11), the switching element T12 is controlled to be in an OFF state. With the switching element T12 in the OFF state, current is prevented from being forwarded by switching element T12 such that a voltage level, increased by the boost circuit 222, is output by the second output terminal Bus−.

In case the comparator CMP detects a voltage difference lower than or equal to a predefined threshold, the switching element T12 is controlled to be in an ON state. With the switching element T12 in the ON state, current is allowed to flow via (i.e. is forwarded by) the switching element T12 such that the boost circuit 222 is bypassed and a voltage level, based on the input voltage, is output by the second output terminal Bus−.

In summary, the configuration of the choke circuit 220, explained above, allows adjusting the voltage level that is output by the output terminals Bus+, Bus− (in particular by the second output terminal Bus−) in response to detected AC signals resulting from data transmissions on the bus. In other words, by increasing the voltage level at the output during time periods of data transmissions, the choke circuit 220 allows compensating for a reduced inductance value of inductor L11.

Advantageously, the choke circuit 220 thereby substitutes for a conventional common-mode choke element while overcoming the need for a rather expensive, bulky and from the manufacturing point of view a highly complex design.

Figure 3:
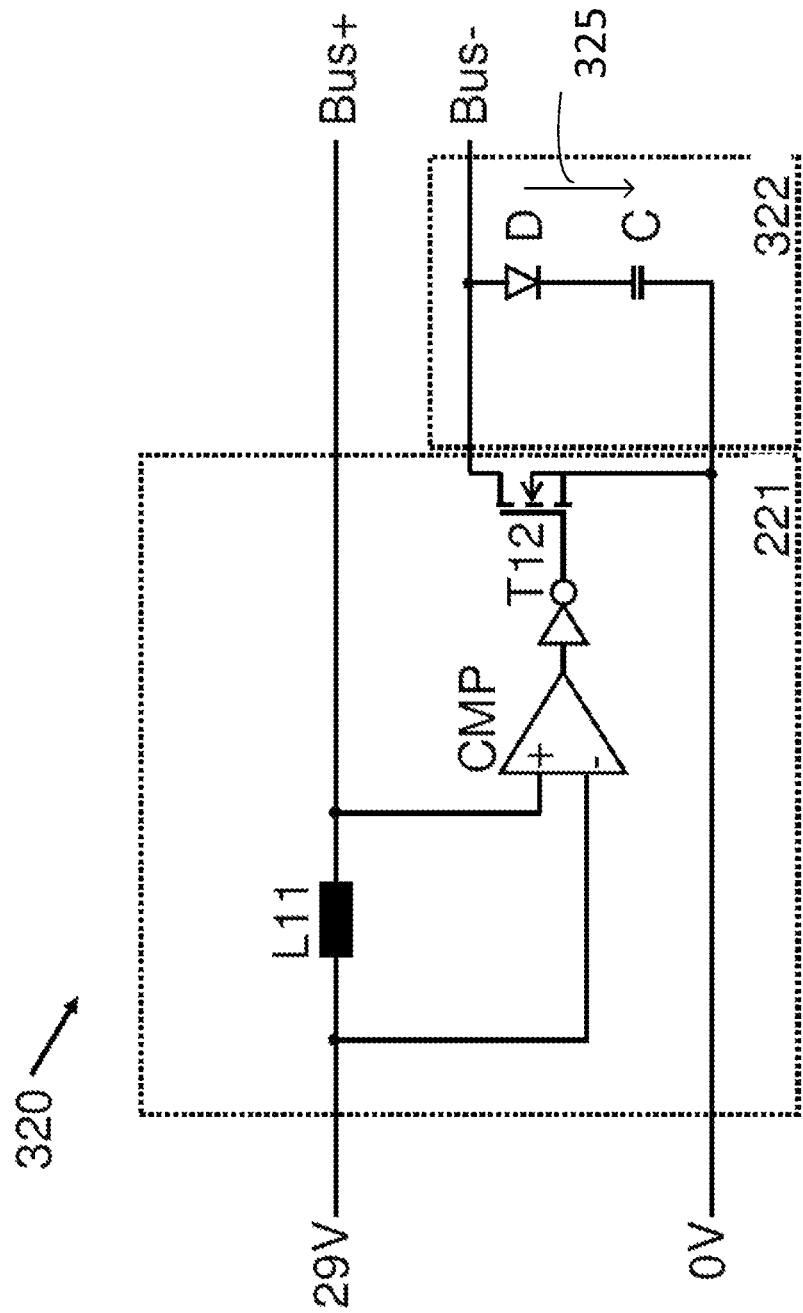
FIG. 3 schematically shows a choke circuit according to a second embodiment of the invention.

Referring now to FIG. 3, a choke circuit 320 according to a second embodiment of the invention is shown. The choke circuit 320 of FIG. 3 is based on the choke circuit 220 of FIG. 2 where corresponding parts are given corresponding reference numerals and terms. The detailed description of corresponding parts has been omitted for reasons of conciseness.

The choke circuit 320 of this embodiment includes the circuit 221 as already described in connection with choke circuit 220. Additionally, the choke circuit 320 includes a first series circuit 322 in place of boost circuit 222. The choke circuit 320 may be used together with an externally connected DC power supply 110 and at least one externally connected bus node 130.

The first series circuit 322 is connected between the second input terminal DC− and the second output terminal Bus−. Accordingly, also in this embodiment the first series circuit 322 is connected in parallel to the switching element T12. Consequently, the switching element T12 is configured so as to enable or disable current to flow via the switching element T12 between the second input terminal DC− and the second output terminal Bus−, thereby bypassing or not-bypassing the first series circuit 322.

The first series circuit 322 includes a diode D16 connected in series with a capacitor C14 and being configured to store, in the capacitor C14, charges flowing as a current drawn by the at least one bus node 130. In other words, the diode D16 is biased to allow current from the second output terminal Bus− to pass and to be stored by capacitor C14.

Referring now to the operation of the first series circuit 322:

The switching element T12 allows, in an ON state, current to flow via the switching element T12 (i.e. via a drain-source channel of T12) between the second input terminal DC− and the second output terminal Bus− such that the first series circuit 322 is bypassed. In an OFF state, the switching element T12 inhibits current from flowing via the switching element T12 (i.e. via a drain-source channel of T12) such that the first series circuit 322 is not bypassed. In this case, the first series circuit 322 increases the voltage level output by the second output terminal Bus−.

In case the comparator CMP detects a voltage difference lower than or equal to a predefined threshold (e.g. higher than the DC resistance of the inductor L11), the switching element T12 is controlled to be in an ON state. With the switching element T12 in the ON state, current is allowed to flow via the switching element T12 such that the first series circuit 322 is bypassed and a voltage level based on the input voltage is output by the second output terminal Bus−.

In case the comparator CMP detects a voltage difference higher than a predefined threshold, the switching element T12 is controlled to be in an OFF state. In this situation, a current $I_{Bus}$ which is flowing on the bus, i.e. between the two output terminals Bus+ and Bus−, is forwarded via diode D16 towards capacitor C14. Accordingly, bus current $I_{Bus}$ charges capacitor C14. At the same time, since the capacitor C14 already stores charges, the voltage level output by the second output terminal Bus− is increased, namely by the voltage corresponding to charges stored on capacitor C14.

Moreover, the bus current $I_{Bus}$ includes an alternating send current (325) $I_{Send} \approx 105$ mA which is drawn by bus node 130 for data transmission and a load current 0 mA ≤ $I_{load}$ ≤ 711 mA resulting from the DC load in all of the at least one bus nodes.

Accordingly, when the switching element T12 is controlled to be in an OFF state, the bus current $I_{Bus}$ forwarded towards capacitor C14 increases the voltage $V_{C14}$ over the capacitor C14.

As apparent to the skilled reader, the bus current $I_{Bus}$ is not sufficient to charge the capacitor C14 during one data transmission (For KNX TP bus the time period of the negative half-wave is defined as approx. t=35 µs).

However, once the capacitor C14 is charged to the predefined voltage level (initial-state of capacitor C14), the bus current $I_{Bus}$ is sufficient to prevent from the capacitor C14 discharging due to leakage currents and maintains the voltage $V_{C14}$ over the capacitor C14 at least at the predefined voltage level.

Moreover, it can be readily appreciated that the choke circuit is for use in a KNX TP bus being an always on bus-system. Accordingly, the initial charging of capacitor C14 occurs only once, namely at assembly of the bus-system.

This predefined voltage level of stored on capacitor C14 enables the first series circuit 322 to increase the voltage level output by the second output terminal Bus−. The predefined voltage level is determined based on the inductance of the inductor L11.

Figure 4:
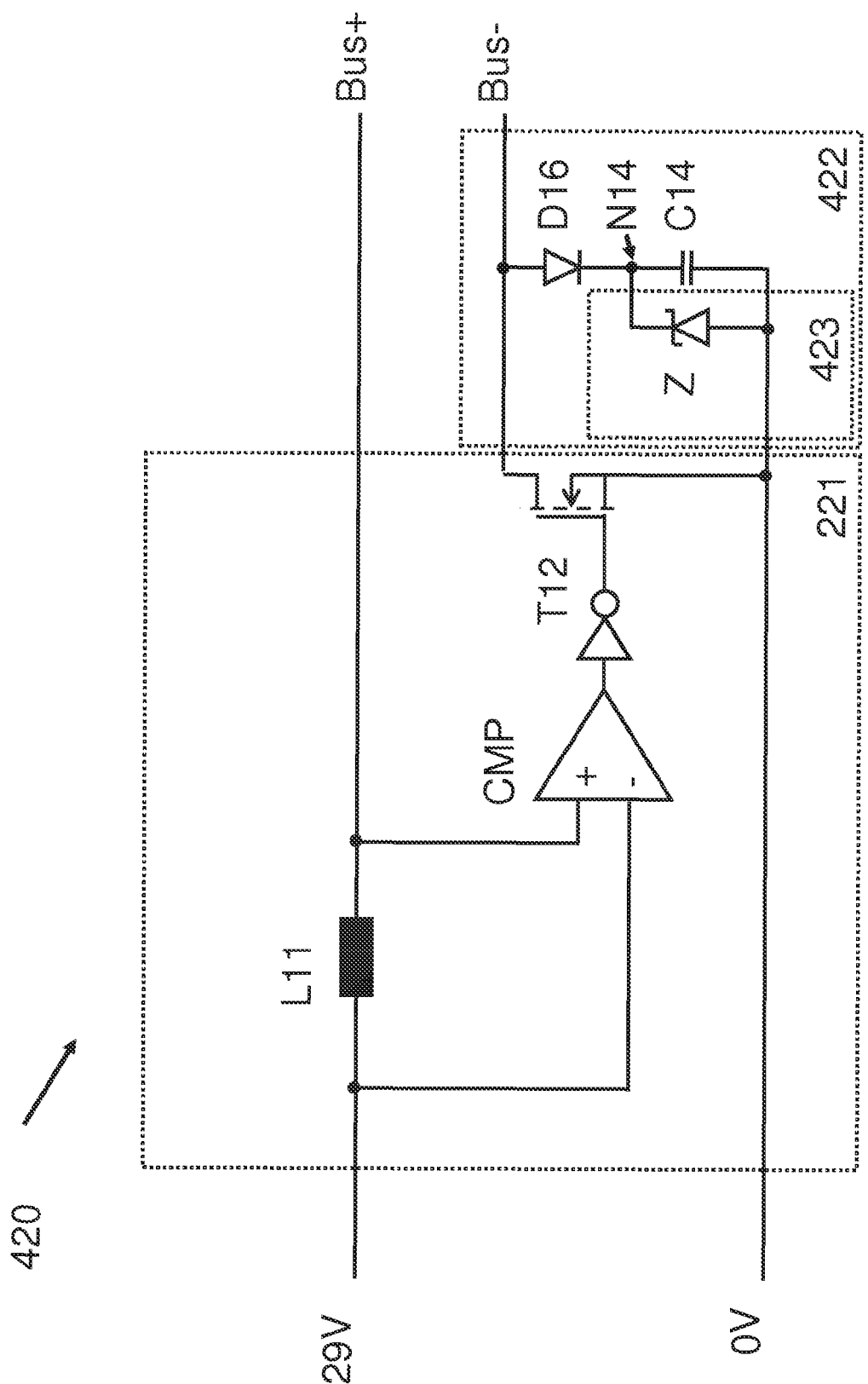
FIG. 4 schematically shows a choke circuit according to a variant of the second embodiment of the invention.
Figure 5:
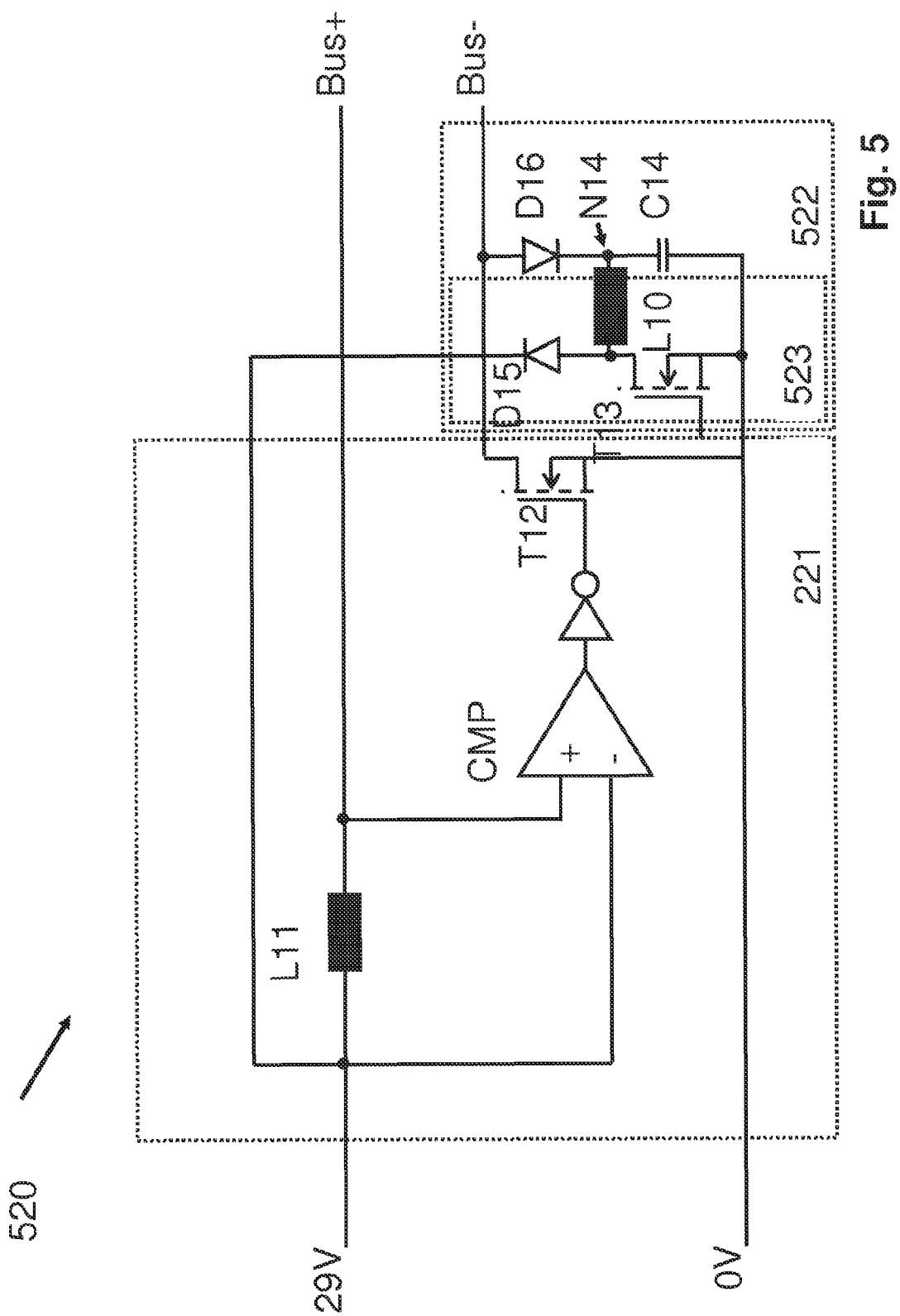
FIG. 5 schematically shows a choke circuit according to an alternative variant of the second embodiment of the invention.
Figure 6:
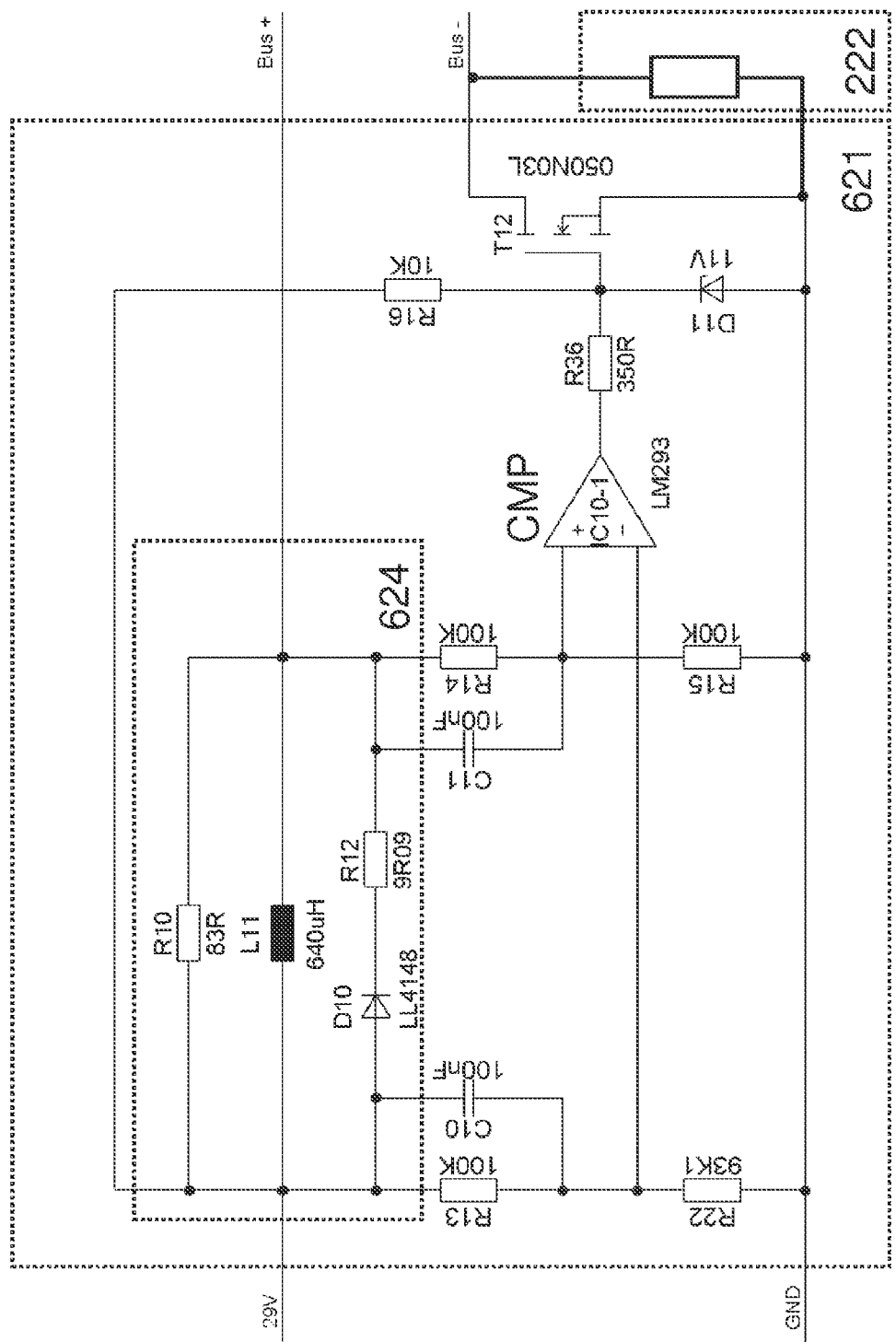
FIG. 6 schematically shows an exemplary implementation of a decoupling circuit for use in the choke circuit according to the second embodiment of the invention.

The different variants of the second embodiment of the invention, as illustrated in FIGS. 4-6, focus on situations where the bus current $I_{Bus}$ flowing on the bus charges the capacitor C14 building-up voltage levels substantially higher than the predefined voltage level defined for increasing the voltage level output by the second output terminal Bus−.

In summary, the configuration of the choke circuit 320, explained above, allows adjusting the voltage level that is output by the output terminals Bus+, Bus− (in particular by the second output terminal Bus−) in response to detected AC signals resulting from data transmissions on the bus. In other words, by increasing the voltage level at the output during time periods of data transmissions, the choke circuit 320 allows compensating for a reduced inductance value of inductor L11.

Advantageously, the choke circuit 320 thereby substitutes for a conventional common-mode choke element while overcoming the need for a rather expensive, bulky and from the manufacturing point of view a highly complex design.

Aside, for an initial charging of the capacitor C14, an external power source may be used that is configured to charge capacitor C14 to the predefined voltage level. Alternatively, an additional charging circuit may be provided as part of the choke circuit to use the voltage level input via input terminals DC+ and DC− for charging the capacitor C14 to the predefined voltage level.

Further alternatively, a start-up procedure may be carried out for charging the capacitor C14 of choke circuit 320. This start-up procedure may include repeated dummy data transmissions for artificially generating a send current to charge capacitor C14. Dummy data transmissions shall be distinguished from "real" data transmissions. The send current of a dummy data transmissions, without assistance by a charged capacitor C14, would not result in a sufficiently large reduction in the potential between Bus+ and Bus− for the bus nodes to correctly decode such data transmission.

Referring now to FIG. 4, a choke circuit 420 according to a variant of the second embodiment of the invention is shown. The choke circuit 420 of FIG. 4 is based on the choke circuit 320 of FIG. 3 where corresponding parts are given corresponding reference numerals and terms. The detailed description of corresponding parts has been omitted for reasons of conciseness.

The choke circuit 420 of this embodiment includes the circuit 221 as already described in connection with choke circuit 220 and 320.

Additionally, the choke circuit 420 includes a different first series circuit 422 in place of boost circuit 222 or first series circuit 322. The choke circuit 420 may be used together with an externally connected DC power supply 110 and at least one externally connected bus node 130.

The first series circuit 422 is connected between the second input terminal DC− and the second output terminal Bus−. Accordingly, also in this embodiment the series circuit 422 is connected in parallel to the switching element T12. Consequently, the switching element T12 is configured to bypass or not-bypass the first series circuit 422.

Further, the first series circuit 422 includes a diode D16 connected in series with a capacitor C14 and being configured to store, in the capacitor C14, charges flowing as current I drawn by the at least one bus node 130. In other words, the diode D16 is configured with a bias to allow current from the second output terminal Bus− to pass and to be stored by capacitor C14.

Additionally, the first series circuit 422 includes a Zener diode Z connected in parallel to the capacitor C14 so as to control the voltage level stored on the capacitor C14. Accordingly, the Zener diode Z is connected reversely biased with respect to the predefined voltage level stored on the capacitor C14.

In other words, the cathode of Zener diode Z is connected to the positive side of the capacitor C14, i.e. to the node N14 interconnecting diode D16 and capacitor C14, and the anode is connected to the negative side of the capacitor, i.e. to the second input terminal DC−.

Referring now to the operation of circuit 422:

The switching element T12 allows, in an ON state, current to flow via the switching element T12 (i.e. via a drain-source channel of T12) between the second input terminal DC− and the second output terminal Bus− such that the first series circuit 422 is bypassed. In an OFF state, the switching element T12 inhibits current from flowing via the switching element T12 (i.e. via a drain-source channel of T12) such that the first series circuit 422 is not bypassed. In this case, the first series circuit 422 increases the voltage level output by the second output terminal Bus−.

In case the comparator CMP detects a voltage difference lower than or equal to a predefined threshold (e.g. higher than the DC resistance of the inductor L11), the switching element T12 is controlled to be in an ON state. With the switching element T12 in the ON state, current is allowed to flow via the switching element T12 such that the first series circuit 422 is bypassed and a voltage level based on the input voltage is output by the second output terminal Bus−.

In case the comparator CMP detects a voltage difference higher than a predefined threshold, the switching element T12 is controlled to be in an OFF state. In this situation, a current $I_{Bus}$ which is flowing on the bus, i.e. between the two output terminals Bus+ and Bus−, is forwarded via diode D16 towards capacitor C14. Accordingly, bus current $I_{Bus}$ charges capacitor C14. At the same time, since the capacitor C14 already stores charges, the voltage level output by the second output terminal Bus− is increased, namely by the voltage corresponding to charges stored on capacitor C14.

In this variant of the choke circuit 420, the Zener diode Z limits the charges to be stored on capacitor C14. Specifically, the breakdown voltage of the Zener diode Z is adapted to correspond to the predetermined voltage level of capacitor C14. Further, the breakdown voltage of the Zener diode Z and the predefined voltage level are determined based on the inductance of the inductor L11.

In more detail, in case the charges flowing as current I build up a voltage across capacitor C14 that is higher than the breakdown voltage of the Zener diode Z corresponding to the predefined voltage level, the Zener diode Z is configured to breakdown and to allow current to flow in reverse direction via Zener diode Z. Accordingly, current which would have charged the capacitor C14 to a higher level than the breakdown voltage of Zener diode Z is discharged towards the second input terminal DC−.

In summary, also the configuration of the choke circuit 420, explained above, allows adjusting the voltage level that is output by the output terminals Bus+, Bus− (in particular by the second output terminal Bus−) in response to detected AC signals resulting from data transmissions on the bus. In other words, by increasing the voltage level at the output during time periods of data transmissions, the choke circuit 420 allows compensating for a reduced inductance value of inductor L11.

Advantageously, the choke circuit 420 thereby substitutes for a conventional common-mode choke element while overcoming the need for a rather expensive, bulky and from the manufacturing point of view a highly complex design.

As a further advantage, the voltage level on the capacitor C14 may be kept constant at the predefined voltage level. Thus, in response to detected data transmissions, choke circuit 420 can precisely adjust the voltage level on the bus for the negative half-wave.

In another variant of the second embodiment which is not illustrated, the previously described Zener diode Z of choke circuit 420 is replaced by a voltage regulator. Voltage regulators are known to be more precise in keeping the voltage level (e.g. the voltage level on the capacitor C14) constant at the predefined voltage level.

Referring now to FIG. 5, a choke circuit 520 according to a further variant of the second embodiment of the invention is shown. The choke circuit 520 of FIG. 5 is based on the choke circuit 320 of FIG. 3 where corresponding parts are given corresponding reference numerals and terms. The detailed description of corresponding parts has been omitted for reasons of conciseness.

The choke circuit 520 of this embodiment includes the circuit 221 as already described in connection with choke circuit 220 of FIG. 2. Additionally, the choke circuit 520 includes a different boost circuit 522 in place of boost circuit 222 of FIG. 2 or first series circuit 322 of FIG. 3. The choke circuit 520 may be used together with an externally connected DC power supply and at least one externally connected bus node.

The boost circuit 522 is connected between the second input terminal DC− and the second output terminal Bus−. Accordingly, also in this embodiment the boost circuit 522 is connected in parallel to the switching element T12. Consequently, the switching element T12 is configured to bypass or not-bypass the first series circuit 522.

The boost circuit 522 includes a diode D16 connected in series with a capacitor C14 and being configured to store, in the capacitor C14, charges flowing as current I drawn by the at least one bus node 130. In other words, the diode D16 is biased to allow current from the second output terminal Bus− to pass and the charges thereof to be stored by capacitor C14.

Additionally, the boost circuit 522 includes a switching converter (e.g. boost converter) 523 configured to adjust the voltage level stored on the capacitor C14 to the predefined voltage level. The switching converter 523 includes switching element T13, inductor L10 and diode D15.

Inductor L10 and switching element T13 form a series circuit which is connected in parallel to the capacitor C14. Specifically, the inductor L10 of the series circuit is connected to the positive side of capacitor C14, i.e. to the node N14 interconnecting diode D16 and capacitor C14, and the switching element T13 of the series circuit is connected to the negative side of capacitor C14, i.e. to the second input terminal DC−.

Further, the cathode of diode D15 is connected to the first input terminal DC+ and the anode of diode D15 is connected to the intermediated node N14 of the series circuit formed of inductor L10 and switching element T13, i.e. the connection between inductor L10 and the drain of switching element T13.

Referring now to the operation of boost circuit 522:

The switching element T12 allows, in an ON state, current to flow via the switching element T12 between the second input terminal DC− and the second output terminal Bus− such that the boost circuit 522 is bypassed. In an OFF state, the switching element T12 inhibits current from flowing between the drain and source of switching element T12 such that the boost circuit 522 is not bypassed. In this case, the boost circuit 522 increases the voltage level output by the second output terminal Bus−.

In case the comparator CMP detects a voltage difference lower than or equal to a predefined threshold (e.g. higher than the DC resistance of the inductor L11), the switching element T12 is controlled to be in an ON state. With the switching element T12 in the ON state, current is allowed to flow via the switching element T12 such that the boost circuit 522 is bypassed and a voltage level based on the input voltage is output by the second output terminal Bus−.

In case the comparator CMP detects a voltage difference higher than the predefined threshold, the switching element T12 is controlled to be in an OFF state. In this situation, a current $I_{Bus}$ which is flowing on the bus, i.e. between the two output terminals Bus+ and Bus−, is forwarded via diode D16 towards capacitor C14. Accordingly, bus current $I_{Bus}$ charges capacitor C14. At the same time, since the capacitor C14 already stores charges, the voltage level output by the second output terminal Bus− is increased, namely by the voltage corresponding to charges stored on capacitor C14.

In this variant of the choke circuit 520, the switching converter (e.g. boost converter) 523 limits the charges to be stored on capacitor C14.

Specifically, switching converter (e.g. boost converter) 523 is controlled to convert excessive energy stored on capacitor C14 from the voltage level over capacitor C14 to a higher voltage level (i.e. the voltage level at the first input terminal DC+) for feed back into the first input terminal DC+.

In this respect, the boost circuit 523 is controlled depending on whether or not the voltage level across capacitor C14 exceeds the predefined voltage level. Specifically, a switching pattern for switching element T13 determines the conversion of the excessive voltage over capacitor C14 into a higher voltage level (i.e. the voltage level at the first input terminal DC+). Application of the switching pattern allows the voltage across capacitor C14 to be maintained at the predefined voltage level determined based on the inductance of inductor L11.

Referring now to the operation of the switching converter (e.g. boost converter) 523:

The switching element T13 is controlled to transfer energy from the capacitor C14 to the inductor L10 during an ON state of switching element T13 and to further transfer this energy from the inductor L10 via diode D15 into the first input terminal DC+ during a subsequent OFF state of switching element T13.

In more detail, in case the switching element T13 is controlled to be in an ON state, current flows from the positive side of the capacitor C14 via inductor L10 and the drain-source channel of switching element T13 to the negative side of the capacitor C14. As a result of the current flowing in inductor L10 a magnetic field created therein.

In case the switching element T13 is controlled to be in an OFF state, the magnetic field in inductor L10 induces voltage which forces a current in the previous direction. Since the current cannot flow via switching element T13 any more (i.e. T13 is in an OFF state), it chooses to flow via diode D15 into the first input terminal DC+.

Consequently, the switching converter (e.g. boost converter) 523 allows feeding back energy into the first input terminal DC+ that was previously stored on the capacitor C14, namely an amount of charges resulting in a voltage level over the capacitor C14 exceeding the predefined voltage level. Accordingly, the voltage level over capacitor C14 is maintained constant at the predefined voltage level.

In summary, also the configuration of the choke circuit 520, explained above, allows adjusting the voltage level that is output by the output terminals Bus+, Bus− (in particular by the second output terminal Bus−) in response to detected AC signals resulting from data transmissions on the bus. In other words, by increasing the voltage level at the output during time periods of data transmissions, the choke circuit 520 allows compensating for a reduced inductance value of inductor L11.

Advantageously, the choke circuit 520 thereby substitutes for a conventional common-mode choke element while overcoming the need for a rather expensive, bulky and from the manufacturing point of view a highly complex design.

As a further advantage, the voltage level on the capacitor C14 may be kept constant at the predetermined voltage level. Thus, in response to detected data transmissions, choke circuit 520 can precisely adjust the voltage level on the bus for the negative half-wave.

Even further advantageously, in the choke circuit 520 the excessive energy stored on capacitor C14 is feed back into the first input terminal DC+ so as to improve the overall efficiency of the bus-system.

Referring now to FIG. 6, an exemplary implementation of a decoupling circuit 621 for use in a choke circuit according to the second embodiment of the invention is shown. The decoupling circuit 621 of FIG. 6 is based on the decoupling circuit 221 of FIGS. 2-5 where corresponding parts are given corresponding reference numerals and terms. The detailed description of corresponding parts has been omitted for reasons of conciseness.

The decoupling circuit 621 of this embodiment includes the components already described in connection with circuit 221 of FIGS. 2-5. In particular, decoupling circuit 621 includes inductor L11 connected between to a first input terminal DC+ and a first output terminal Bus+; switching element T12 connected between the second input terminal DC− and the second output terminal Bus−, and comparator CMP connected to the first input terminal DC+ and to the first output terminal Bus− for enabling control of the switching element T12.

The exemplary implementation of decoupling circuit 621, additionally, includes a protection circuit 624. The protection circuit 624 is for limiting the peak voltage inducted by inductor L11 at times $t_0$ and $t_2$ as indicated in FIG. 1b.

For this purpose, the protection circuit 624 includes resistor R10 and a second series circuit formed of a diode D10 and of another resistor R12 are included, wherein both the resistor R10 and the second series circuit are connected in parallel to the inductor L11. The send current $I_{Send}$ at time $t_0$ flows in the forward direction of diode D10 and is limited by the parallel circuit of R10 and R12; the reverse current at time $t_2$ flows in reverse direction of diode D10 and, hence, is limited by resistor R10 only.

The exemplary implementation of decoupling circuit 621, additionally, includes a two voltage divider circuits. The voltage divider circuits are for respectively dividing the voltage at the first input terminal DC+ and the first output terminal Bus+ so as to be input into the comparator CMP.

Specifically, the inverting input of the comparator CMP is connected via first voltage divider R13, R22 and a capacitor C10 to the first input terminal DC+, and the non-inverting input of the comparator CMP is connected via second voltage divider R14, R15 and another capacitor C11 to the first output terminal Bus−. Capacitors C10 and C11 suppress electromagnetic interference.

The exemplary implementation of decoupling circuit 621, additionally, includes a driver circuit. The driver circuit enables the comparator CMP to control the switching element T12, both for controlling the switching element T12 to be in an OFF state and for controlling the switching element T12 to be in an ON state.

For controlling the switching element T12 to be in an OFF state, the gate of switching element T12 has to be set to a ground voltage. Accordingly, a current would flow from the gate of switching element T12 via the rail terminals of comparator CMP to the second input terminal DC−. For limiting this current and for protecting comparator CMP, the output terminal of comparator CMP is connected via resistor R29 to the gate terminal of switching element T12.

Further, for controlling the switching element T12 to be in an ON state, the gate-source voltage of switching element T12 has to be set to a level higher than a predetermined switching voltage. In the specific case, a pull-up resistor R16 is used to drive the gate of switching element T12 via first input terminal DC+, whereas a Zener diode D11 limits the voltage level at the gate of switching element T12 by way of its breakdown voltage. Moreover, the resistance of pull-up resistor R16, connecting the first input terminal DC+ and the gate of switching element T12, limits the pull-up current.

As can be readily appreciated from the above, the different circuits (i.e. protection circuit 624, voltage divider circuits, and driver circuit) described with respect to FIG. 6 provide for separate effects and, hence, may be used in variable configurations of choke circuit according to any of FIGS. 2-5. In other words, a choke circuit according to any of FIGS. 2-5 must not necessarily implement all the different circuits described with respect to FIG. 6 but may also implement a subset thereof.

Figure 7:
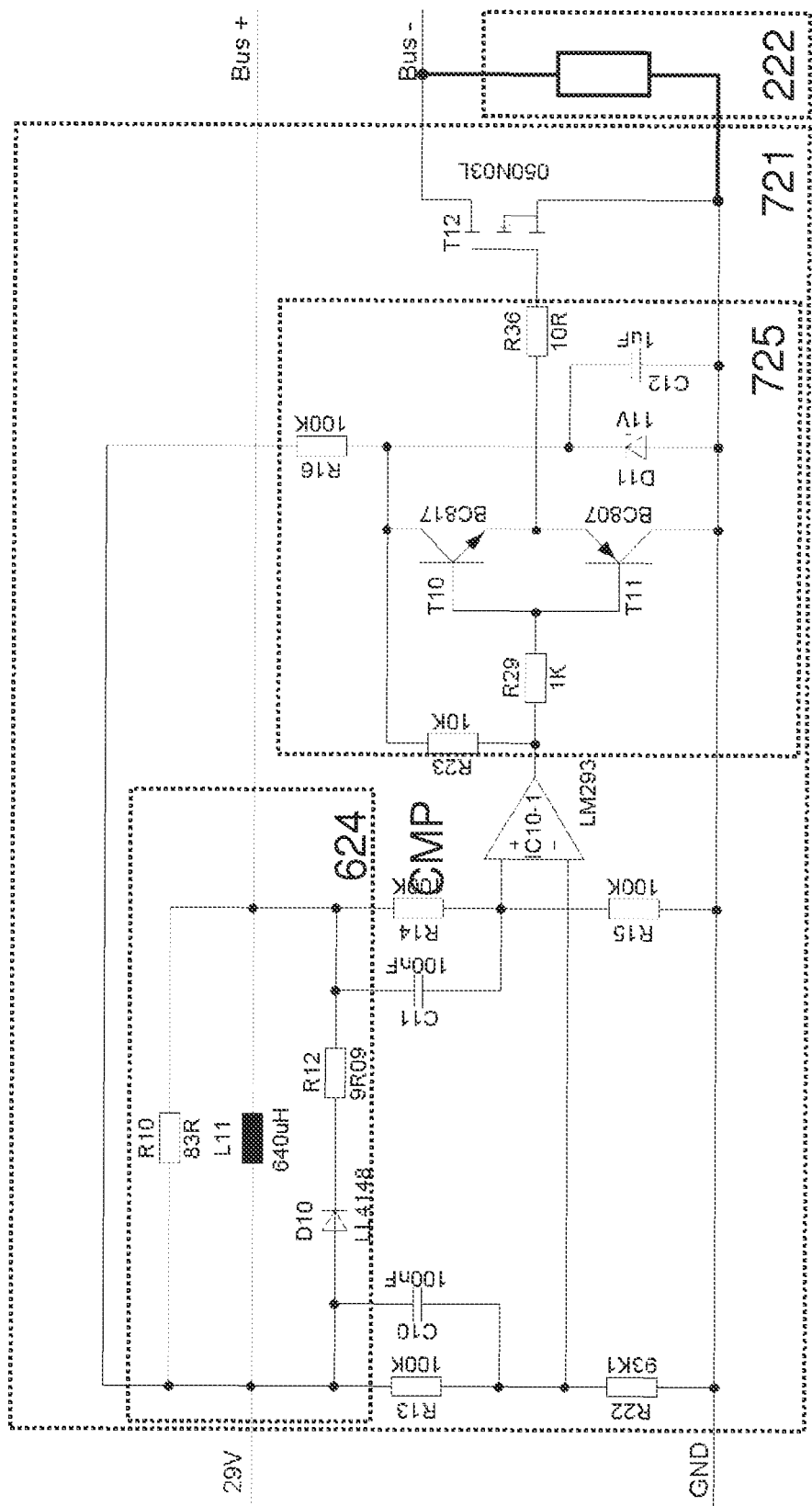
FIG. 7 schematically shows another exemplary implementation of a decoupling circuit for use in the choke circuit according to the second embodiment of the invention.

Referring now to FIG. 7, another exemplary implementation of a decoupling circuit 721 for use in a choke circuit according to the second embodiment of the invention is shown. The decoupling circuit 721 of FIG. 7 is based on the decoupling circuit 621 of FIG. 6 where corresponding parts are given corresponding reference numerals and terms. The detailed description of corresponding parts has been omitted for reasons of conciseness.

The decoupling circuit 721 of this embodiment includes the components already described in connection with circuit 221 of FIGS. 2-5 and additionally the protection circuit 624 and the two voltage divider circuits described in connection with circuit 621 of FIG. 6.

Further, the exemplary implementation of decoupling circuit 721 includes a different driver circuit 725. The driver circuit 725 enables the comparator CMP to control the switching element T12 at higher speed. Accordingly, the driver circuit 725 enables the switching element T12 to faster change states, namely from an OFF state to an ON state and vice versa.

For this purpose, the driver circuit 725 includes two complementary switching elements T10 and T11 connected in series between a supply voltage and a reference voltage. The gate of both switching elements T10 and T11 is connected via resistor R19 to the output of the comparator CMP and a pull-up resistor R23 supplies high voltage level to the output of the comparator CMP. Advantageously the complementary switching elements T10 and T11 are never both conducting at a same time such that the efficiency is improved with respect to the driver circuit of FIG. 6.

Exemplary, the supply voltage of the complementary switching elements T10 and T11 may be limited in accordance with the input voltage limitations of switching element T12, by resistor R16, Zener diode D11 and capacitor C12. Additionally, drive current to be supplied to the gate of switching element T12 may be limited by resistor R36 as explained earlier.

Again, also in this case the different circuits (i.e. protection circuit, voltage divider circuits, and driver circuit 725) described with respect to FIG. 7 provide for separate effects and, hence, may be used in variable configurations of choke circuit according to any of FIGS. 2-5. In other words, a choke circuit according to any of FIGS. 2-5 must not necessarily implement all the different circuits described and illustrated with respect to FIG. 7 but may also implement a subset thereof.

Figure 8:
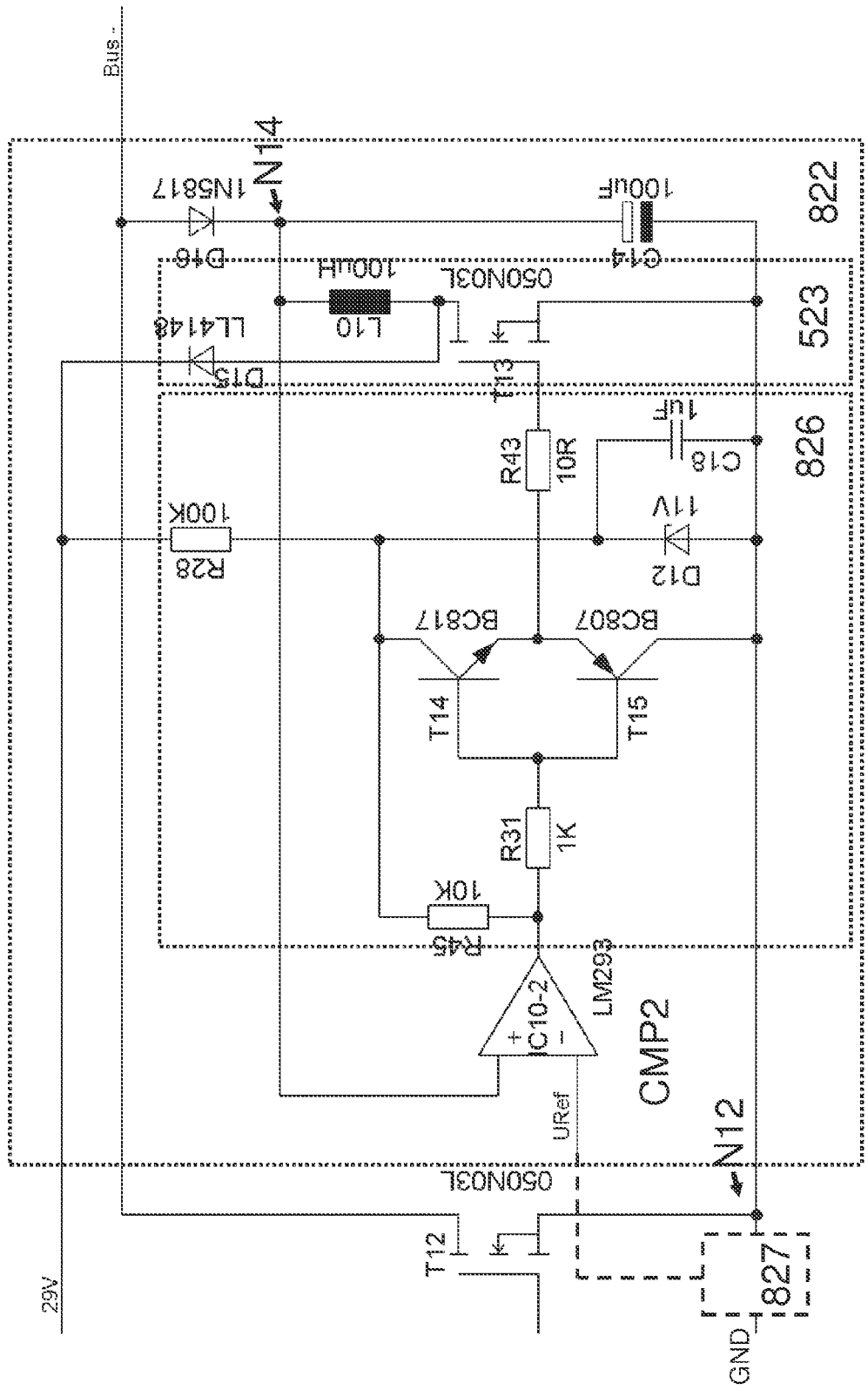
FIG. 8 schematically shows an exemplary implementation of a boost circuit for use in the choke circuit according to the second embodiment of the invention.

Referring now to FIG. 8, an exemplary implementation of a boost circuit 822 for use in a choke circuit according to the second embodiment of the invention is shown. The boost circuit 822 of FIG. 8 is based on the boost circuit 522 of FIG. 5 where corresponding parts are given corresponding reference numerals and terms. The detailed description of corresponding parts has been omitted for reasons of conciseness.

The boost circuit 822 of this embodiment includes the components already described in connection with circuit 522 of FIG. 5. In particular, boost circuit 822 includes diode D16, capacitor C14 and switching converter (e.g. boost converter) 523 formed of inductor L10, diode D15 and switching element T13. Accordingly, switching converter (e.g. boost converter) 523 allows feeding back energy into the first input terminal DC+ that was previously stored on the capacitor C14, namely an amount of charges resulting in a voltage level over the capacitor C14 exceeding the predefined voltage level.

For detecting whether or not the voltage level over the capacitor C14 exceeds the predefined voltage level, a second comparator CMP2 is provided, wherein the non-inverting input of the second comparator CMP2 is connected to the node N14 interconnecting diode D16 and capacitor C14 and the inverting input of the second comparator CMP2 is supplied with a reference voltage level $U_{ref}$. The reference voltage level $U_{ref}$ is generated by reference voltage source 827 and will be exemplified in more detail in connection with FIG. 9.

Accordingly, in case of changes of the voltage over capacitor C14, the second comparator CMP2 detects a voltage difference between the supplied reference voltage level $U_{ref}$ and the voltage $U_{C14}$ at node N14 interconnecting diode D16 and capacitor C14. This detection result of the second comparator CMP is utilized for control of the switching element T13.

Specifically, in case the second comparator CMP2 detects a voltage difference, the switching element T13 is controlled to be in an ON state. In more detail, in case the switching element T13 is controlled to be in an ON state, current flows from the positive side of the capacitor C14 via inductor L10 and the drain-source channel of switching element T13 to the negative side of the capacitor C14. As a result of the current flowing in inductor L10 a magnetic field created therein.

In case the comparator CMP2 detects no voltage difference, the switching element T13 is controlled to be in an OFF state. In case the switching element T13 is controlled to be in an OFF state, the magnetic field in inductor L10 induces voltage which forces a current in the previous direction. Since the current cannot flow via switching element T13 any more (i.e. T13 is in an OFF state), instead it flows via diode D15 into the first input terminal DC+.

The exemplary implementation of boost circuit 822 includes driver circuit 826. The driver circuit 826 enables the second comparator CMP2 to control the switching element T13 at higher speed. Accordingly, the driver circuit 826 enables the switching element T13 to faster change states, namely from an OFF state to an ON state and vice versa.

For this purpose, the driver circuit 826 includes two complementary switching elements T14 and T15 connected in series between a supply voltage node and a reference voltage (GND node). The gate of both switching elements T14 and T15 is connected via resistor R31 to the output of the second comparator CMP2 and a pull-up resistor R45 supplies high voltage level to the output of the second comparator CMP2. Advantageously the complementary switching elements T14 and T15 are never both conducting at a same time.

Exemplary, the supply voltage of the complementary switching elements T14 and T15 may be limited in accordance with the input voltage limitations of switching element T13, by resistor R28, Zener diode D12 and capacitor C18. Additionally, drive current to be supplied to the gate of switching element T13 may be limited by resistor R43 as explained earlier.

Again, also in this case the driver circuit 826 described with respect to FIG. 8 provides for a separate effect of improving the switching speed of transistor T13 and, hence, may also be dispensed with. Moreover, the driver circuit 826 may also be realized as described in connection with FIG. 6, at the benefit of a more compact, cheaper design.

Figure 9:
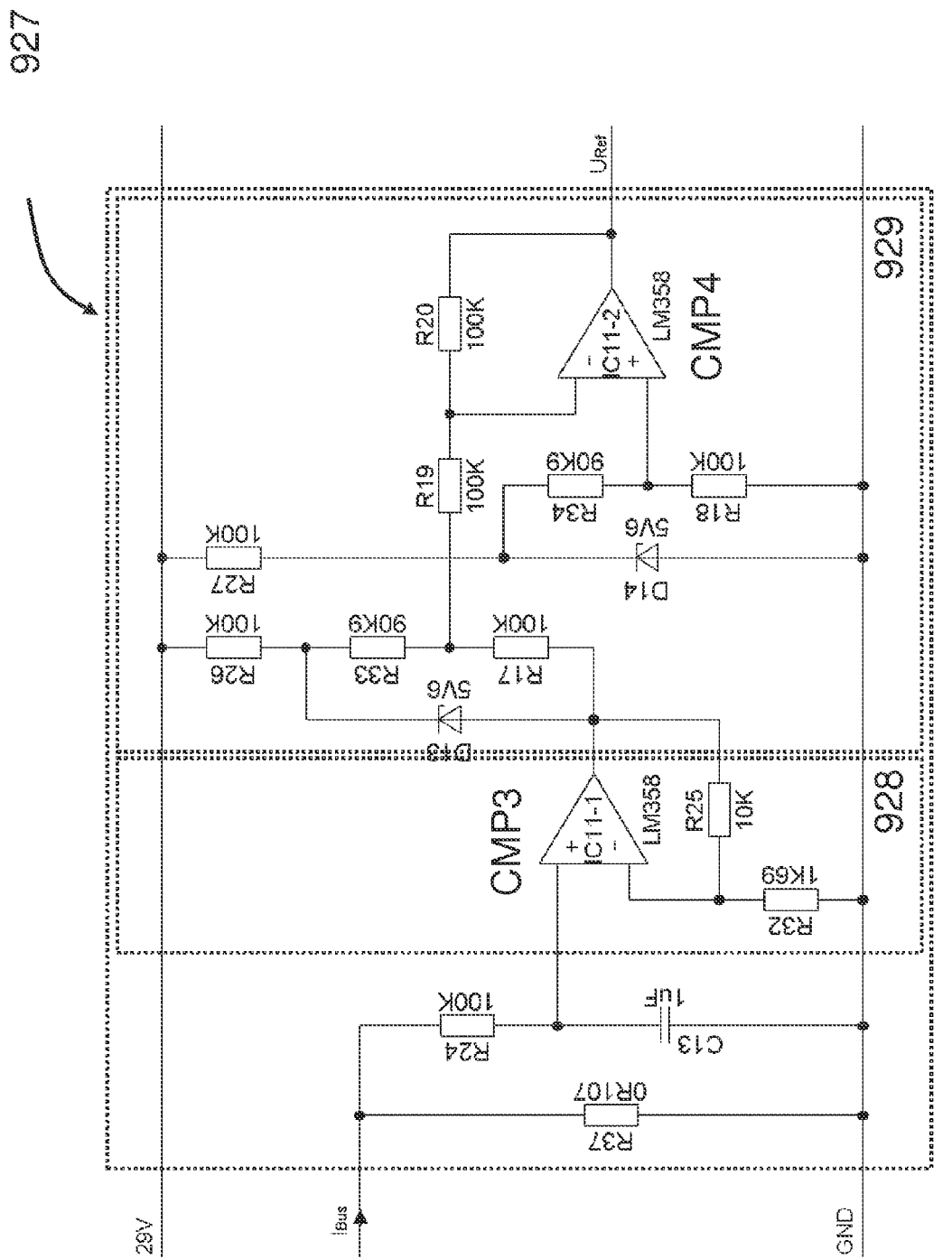
FIG. 9 schematically shows a reference voltage source 1026 for use with the implementation of a boost circuit of the choke circuit of FIG. 9 according to second embodiment of the invention.

Referring now to FIG. 9, an exemplary implementation of a reference voltage source 927 for use in a choke circuit according to the second embodiment of the invention is shown.

The reference voltage source 927 of FIG. 9 may exemplary provide the reference voltage level $V_{ref}$ for use in the boost circuit 822 of FIG. 8. The reference voltage source 927 may be used in place of the reference voltage source 827 of FIG. 8. In this respect, an output of the reference voltage source 927 would be connected to the inverting input of the second comparator CMP2 of boost circuit 822 of FIG. 8.

However, it is apparent to the skilled reader that any kind of voltage source 827 may be provided a reference voltage level $V_{ref}$ which is determined based on the predefined voltage level.

In more detail, the reference voltage source 927 supplies a reference voltage level $V_{ref}$ that is determined based on a DC bus load resulting from at least bus node connected to the output terminals Bus+ and Bus−.

As previously explained, the bus current $I_{Bus}$ includes a send current $I_{send}$ which is drawn by a bus node for data transmission and a load current $I_{load}$ resulting from the DC load in all of the at least one bus nodes.

Accordingly, the DC bus load may be determined based on the load current $I_{load}$ forwarded between the two output terminals Bus+ and Bus−. For simplicity, the DC bus load may also be determined based on the bus current $I_{Bus}$, namely by filtering out AC components including the send current $I_{Send}$ forwarded between the two output terminals Bus+ and Bus−.

In more detail, for determining the DC bus load, in a first step the bus current $I_{Bus}$ or the load current $I_{load}$ is converted in a voltage, then in a second step the voltage is amplified and in a third step, the amplified voltage is converted such that it compensates during data transmissions for a voltage drop over inductor L11, namely for the duration of the negative half-wave of (i.e. between the times $t_1$ and $t_2$ as indicated in FIG. 1b).

Regarding the first step, reference voltage source 927 includes a shun resistor R37. The shunt resistor R37 has a small resistance matched to the DC resistance of inductor L11. Further, the shunt resistor R37 is connected so as to carry the bus current $I_{Bus}$ or the load current $I_{load}$. Thereby, a voltage can be measured in parallel to the shunt resistor R37 and allows voltage conversion in a subsequent step.

Preferably, the shunt resistor R37 of reference voltage source 927 is connected as indicated for reference voltage source 827, namely such that it intercepts the current flow towards the second input terminal DC−. In other words, the shunt resistor R37 is connected between the second input terminal DC− and intermediate node N12 to which the switching element T12 and the boost circuit 822 is connected. Consequently, the shunt resistor R37 carries the bus current $I_{Bus}$ including the load current $I_{load}$ affected by the bus load.

In order to determine the DC component of the bus current $I_{Bus}$ flowing through shunt resistor R37 (i.e. for removing the AC components including the send current $I_{send}$) a RC low-pass filter (e.g. formed of resistor R24 and capacitor C13) is connected in parallel to the shunt resistor R37.

Alternatively, the shunt resistor R37 of reference voltage source 927 is connected such that it intercepts current from the switching element T12 only (e.g. between source terminal of switching element T12 and the intermediated node N12 indicated in FIG. 8). Moreover, in this case the shunt resistor R37 only carries the load current $I_{load}$.

Regarding the second step, the output from the RC low-pass filter is input to amplifier 928 for amplifying the voltage level output by the RC low-pass filter to a predefined voltage range (i.e. 0 . . . 530 mV). For this purpose, the output of the RC low-pass filter is connected to amplifier 928 realized as non-inverting amplifier (e.g. formed of a third comparator CMP3 and resistors R25 and R32). Consequently, the voltage over the shunt resistor R38 is filtered and then amplified by a predetermined, constant scale factor (e.g. of approx. 10) such that the voltage corresponds to the DC load of the bus.

Regarding the third step, the output from the amplifier 928 is input to conversion circuit 929 for it to be mapped to reference voltage levels that correspond to a low or a high bus load, respectively. The reference voltage levels provided by the conversion circuit 929 is provided for use in the boost circuit 822 of FIG. 8.

Specifically, it has proven advantageous that, in case of a fully loaded bus, the reference voltage level to be output by reference voltage source 927 is $V_{ref} \approx 2.4V$ and in case of a bus without DC load, the reference voltage level to be output by reference voltage source 927 is $V_{ref} \approx 2.93V$.

| No DC load current ($I_{load} \approx 0$ mA) | reference voltage source $V_{ref} \approx 2.93$ V |
| Full DC load current ($I_{load} \approx 711$ mA) | reference voltage source $V_{ref} \approx 2.4$ V |

For this purpose, the conversion circuit 929 includes a fourth comparator CMP4. The non-inverting input of the fourth comparator CMP4 is provided with a reference voltage level of 2.93V (e.g. supplied by a reference voltage source formed of the series circuit of Zener diode D14 and resistor R27 and of the voltage divider circuit of resistors R34 and R18). The inverting input of the fourth comparator CMP4 is provided with the output (i.e. voltage in the range of 0 . . . 530 mV) of the amplifier 928 including an offset of 2.93V (e.g. supplied by another reference voltage source formed of the series circuit of Zener diode D13 and resistor R26 and of the voltage divider circuit of resistors R33 and R17).

Consequently, the fourth comparator CMP4 does not amplify the voltage difference, it merely determines the difference between its inputs to arrive at $V_{ref} \approx 2.4V$ for a fully loaded bus and at $V_{ref} \approx 2.93V$ for a bus without DC load. In this respect, the boost circuit 822 of FIG. 8 in combination with reference voltage source 927 of FIG. 9 may compensates during data transmissions for a voltage drop over inductor L11, namely for the duration of the negative half-wave of (i.e. between the times $t_1$ and $t_2$ as indicated in FIG. 1b).

What is claimed is:
1. A choke circuit for providing an input voltage supplied by a DC power supply to at least one bus node, comprising:
two input terminals for receiving the input voltage supplied by the DC power supply;
two output terminals for outputting a voltage level based on the input voltage to the at least one bus node;
an inductor connected between a first input terminal and a first output terminal;
a boost circuit connected between the second input terminal and the second output terminal for increasing the voltage level, which is output by the second output terminal, by a predetermined amount that is based on the inductance of the inductor, wherein the boost circuit includes a first series circuit connected between the second input terminal and the second output terminal, the first series circuit being formed of a diode and a capacitor for storing, in the capacitor, charges flowing as a send current between the two output terminals, wherein the send current results from a data transmission of one of the at least one bus node, and wherein the boost circuit is configured to increase by an amount of charges stored in the capacitor the voltage level that is output by the second output terminal;
a switching element connected in parallel to the boost circuit for bypassing the boost circuit interposed between the second input terminal and the second output terminal;
a comparator connected between the first input terminal and the first output terminal for detecting a potential difference across the inductor;
wherein in case the comparator detects a potential difference higher than a threshold, the switching element is controlled to be in an OFF state such that the voltage level, increased by the boost circuit, is output by the second output terminal, which is lower than the voltage level of the first output terminal; and
in case the comparator detects a potential difference lower than or equal to the threshold, the switching element is controlled to be in an ON state such that the boost circuit is bypassed and the voltage level, corresponding to the input voltage, is output by the second output terminal, which is lower than the voltage level of the first output terminal.

2. The choke circuit according to claim 1, wherein the boost circuit is configured to increase by a predefined voltage level the voltage level that is output by the second output terminal, the predefined voltage level being determined based on the inductance of the inductor.

3. The choke circuit according to claim 1, wherein the first series circuit additionally includes a zener diode connected in parallel to the capacitor for limiting the amount of charges stored on the capacitor such that the voltage across capacitor corresponds to the predefined voltage level.

4. The choke circuit according to claim 1, wherein the first series circuit additionally includes a voltage regulator connected in parallel to the capacitor for limiting the amount of charges stored on the capacitor such that the voltage level across capacitor corresponds to the predefined voltage level.

5. The choke circuit according to claim 1, wherein the first series circuit further includes:
a switching converter connected in parallel to the capacitor for limiting the amount of charges stored on the capacitor by up-converting and feeding back energy onto the first input terminal such that the voltage level across capacitor corresponds to the predefined voltage level.

6. The choke circuit according to claim 1, further comprising:
a resistor and a second series circuit, formed of a diode and of another resistor, both the resistor and the second series circuit being connected in parallel to the inductor.

7. The choke circuit according to claim 1, wherein an inventing input of the comparator is connected via first voltage divider and a capacitor to the first input terminal, and a non-inverting input of the comparator is connected via second voltage divider and another capacitor to the first output terminal.

8. The choke circuit according to claim 1, further comprising:
a pull-up resistor configured to supply a voltage to the first switching element for enabling the comparator to control the switching element, and
a resistor configured to connect the output of the comparator to the gate terminal of the switching element; alternatively comprising:
a driving circuit configured to drive an output voltage of the comparator for control of the switching element.

9. A bus power supply for providing the voltage level to at least one bus node comprising:
a DC power supply for providing a DC voltage; and
a choke circuit according to claim 1, wherein the DC power supply is connected to the two input terminals of the choke circuit.

10. The choke circuit according to claim 5, wherein the switching converter comprises:
a series circuit of an inductor and a switching circuit connected in parallel to the capacitor; and
a diode connected to the intermediated node of the series circuit of the inductor and the switching element and to the first input terminal and configured to provide feedback energy from the inductor into the first input terminal.

11. The choke circuit according to claim 10, further comprising:
a reference voltage source for generating a reference voltage, the reference voltage being determined based on the predefined voltage level;
a second comparator configured to compare a voltage across the capacitor with the reference voltage; and
wherein the switching element of the switching converter is configured to be controlled based on the comparison result of the second comparator.

12. The choke circuit according to claim 11, wherein the reference voltage supplied by the reference voltage source is varied based on a DC bus load resulting from the at least one bus node.

13. The choke circuit according to claim 11, where the reference voltage source further comprises:
a shunt resistor connected so as to carry the load current affected by the DC bus load, and wherein the resistance value of the shunt resistor corresponds to the DC resistance of the inductor.

14. The choke circuit according to claim 13, wherein the reference voltage source further comprises:
a converter circuit for filtering, amplifying and converting the voltage over the shunt resistor and outputting it as a reference voltage to the second comparator.

\* \* \* \* \*